Jan. 31, 1961 D. A. ROGERS, JR., ET AL 2,970,231
PACKING COMPOSITION FOR TURBINE GENERATOR EXCITER ROTORS
Filed Oct. 8, 1958
2 Sheets-Sheet 1

WITNESSES
John E. Healy, Jr.
Charles L. Menzemer

INVENTORS
Dow A. Rogers, Jr. &
Robert J. Hillen
BY
Frederick Shopoe
ATTORNEY

Thermal Stability
(Weight In Air At 175°C)

Water Absorption Versus Days At Humidification

Time Of Humidification In Days
100% Relative Humidity At 40°C

United States Patent Office 2,970,231
Patented Jan. 31, 1961

2,970,231

PACKING COMPOSITION FOR TURBINE GENERATOR EXCITER ROTORS

Dow A. Rogers, Jr., Wilkens Township, Allegheny County, and Robert J. Hillen, Pittsburgh, Pa., assignors to Westinghouse Electric Corporation, East Pittsburgh, Pa., a corporation of Pennsylvania Filed Oct. 8, 1958, Ser. No. 765,988

1 Claim. (Cl. 310—43)

This invention relates to a packing composition and more particularly to a packing composition for turbine generator exciter rotors comprising the reaction product of an epoxy resin and certain dimer acids.

Turbine generator exciter rotors designed for high speed operations, for example, on the order of from 1800 to 3600 r.p.m. sometimes are provided with shrink-ring type commutators. To provide adequate creepage distances between the risers and the centering plate or centering plate ring, the area behind the commutator neck is filled with a packing composition. This composition also prevents the entrance of contaminants such as carbon dust, oil and dirt which would form creepage paths from the metal conductors to a grounded portion of the machine.

Ideally, such a packing composition, upon polymerization or curing, should be free from voids and cracks to prevent the entrance of contaminants. The composition also should be resilient to withstand contraction and expansion of the metal conductors yet strong enough to resist the shear stresses resulting from expansion and contraction of the risers and from centrifugal force. Further, the packing composition must be thermally stable and capable of providing adequate electrical insulation for equipment operating at class "B" temperatures (130°–155° C.) and possess low water absorption characteristics under humid conditions.

Certain of the packing compositions available commercially have for the most part been comprised of filled solvent-type phenolic resins. Such resins have not been completely satisfactory because among other reasons, (1) the solvent contained in the resin leaves intricate paths or voids in the cellular type structure upon evaporation during the curing cycle, and (2) the resin becomes increasingly brittle and cracks during thermal cycling in the normal operation of the machine. These cracks become filled with conductive particles which lower the insulation resistance of the resin and sometimes make it necessary to shut down the machines periodically for field repairs.

The surprising discovery has now been made that a packing composition suitable for application to turbine generator exciter rotors may be prepared by admixing specific quantities of certain epoxy resins and dimer acids which are discussed more fully below.

An object of the present invention is to provide a heat hardenable resinous composition comprised of the reaction product of from 10 to 90 parts by weight of an epoxy resin and from 90 to 10 parts by weight of a dimer acid.

Another object of the present invention is to provide a turbine generator in which the exciter rotor behind the commutator ring has been protected against contamination by the application of a packing composition comprising the reaction product of from 10 to 90 parts by weight of an epoxy resin and from 90 to 10 parts by weight of a dimer acid.

For a better understanding of the nature and objects of the invention, reference should be had to the following detailed description and drawing, in which.

Figure 1:
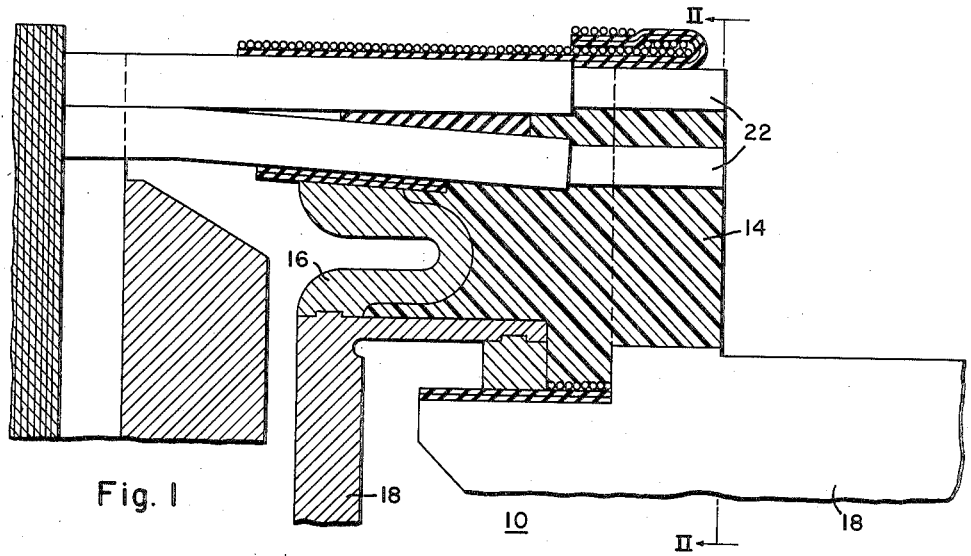
Figure 1 is a fragmentary side view in cross section of a turbine generator exciter rotor packed with the composition of this invention.

In accordance with the present invention and attainment of the foregoing objects there is provided a resinous composition comprised of the reaction product of from 10 to 90 parts by weight of certain epoxy resins and from 90 to 10 parts by weight of certain dimer acids.

In accordance with another aspect of this invention, there is provided a turbine generator exciter rotor in which the area between the commutator ring and centering ring is packed with the aforementioned heat hardened resinous potting composition of this invention.

A resinous polymeric epoxide, also known as glycidyl polyether, suitable for use in accord with the present invention may be prepared by reacting predetermined amounts of at least one polyhydric phenol and at least one epihalohydrin in an alkaline medium.

Phenols which are suitable for use in preparing such resinous polymeric epoxides include those which contain at least two phenolic hydroxy groups per molecule. Polynuclear phenols which have been used and found to be particularly suitable include those wherein the phenolic nuclei are joined by carbon bridges such, for example, as 4,4'-dihydroxy-diphenyl-dimethyl methane (referred to hereinafter as bis-phenol "A"), 4,4'-dihydroxy-diphenyl methyl-methane and 4,4'-dihydroxy-diphenyl-methane. In admixture with the named phenolic nuclear phenols, use also may be made of those polynuclear phenols wherein the phenol nuclei are joined by sulfur bridges, such, for example, as 4,4'-dihydroxy-diphenyl-sulfone.

While it is preferred to use epichlorohydrin as the epihalohydrin in the preparation of the resinous polymeric epoxide starting materials of the present invention, epibromohydrin and the like may also be used advantageously.

In the preparation of the resinous polymeric epoxide, aqueous alkali is employed to combine with the halogen of the epihalohydrin reactant. The amount of alkali employed should be substantially equivalent to the amount of halogen present and preferably should be employed in an amount somewhat in excess thereof. Aqueous mixtures of alkali metal hydroxides such as potassium hydroxide and lithium hydroxide, may be employed although it is preferred to use sodium hydroxide since it is relatively inexpensive.

The resinous polymeric epoxide, or glycidyl polyether of a dihydric phenol, suitable for use in this invention has a 1,2-epoxy equivalent greater than one. By epoxy equivalent, reference is made to the average number of 1,2-epoxy groups:

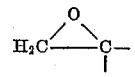

contained in the average molecule of the glycidyl ether. Owing to the method of preparation of the glycidyl polyethers and that they are ordinarily a mixture of chemical compounds having somewhat different molecular weights and contain some compounds wherein the terminal glycidyl radicals are in hydrated form, the epoxy equivalence of the product is not necessarily the integer 2.0 However, in all cases it is a value greater than 1.0. The 1,2-epoxy equivalence of polyethers is thus a value between 1.0 and 2.0.

Resinous polymeric epoxides or glycidyl polyethers suitable for use in accordance with this invention may be prepared by admixing and reacting from 1 to 10 mol proportions of an epihalohydrin, preferably epichlorohydrin, with about 1 mol proportion of bis-phenol "A" in the presence of at least a stoichiometric excess of alkali based on the amount of halogen. To prepare the resinous polymeric epoxides, aqueous alkali, bis-phenol "A" and epichlorohydrin are introduced into and admixed in a suitable reaction vessel. The aqueous alkali serves to dissolve the bis-phenol "A" with the formation of alkali salts thereof. If desired, the aqueous alkali and bis-phenol "A" may be admixed initially and then the epichlorohydrin added thereto, or an aqueous solution of the alkali and bis-phenol "A" may be added to the epichlorohydrin. In any case, the mixture is heated in the vessel to a temperature within the range of about 80° C. to 110° C. for a period of time varying from about one-half hour to three hours, or more depending upon the quantities of reactants used.

Upon completion of heating, the reaction mixture separates into layers. The upper aqueous layer is withdrawn and discarded, and the lower layer is washed with hot water to remove unreacted alkali and halogen salt, in this case, the sodium salt. If desired, dilute acids, for example, acetic acid or hydrochloric acid, may be employed during the washing procedure to neutralize the excess alkali.

The dimer acid constituent of the composition imparts improved flexibility and toughness to the composition and increases the rate at which the composition will cure.

Dimer acids which are suitable for use in this invention comprise polymerized fatty acids derived from unsaturated fatty acids by a reaction known as dimerization. The dimer acid constituent consists essentially of the dimerization product of mono-di-and/or tri-carboxylic acids having a carbon atom chain length of from 10 carbon atoms to 24 carbon atoms per molecule and mixtures thereof. Examples of suitable fatty acids include, myristoleic, linoleic, linolinic, nypogeic and erucic.

Broadly, the combination of this resin comprises the epoxy resin prepared as described above and the dimer acid constituent. Compositions comprised of only the epoxy and the dimer acid constituents cure in 40 hours when heated to a temperature of 125—150° C. At lower temperatures, for example, 80° C. a thorough cure may be obtained after one week. To facilitate the curing of the composition up to 15% by weight, based on the weight of epoxy resin, of a suitable amine catalyst may be used. Suitable catalysts for use with epoxy resin-dimer acid compositions of this invention are amine catalysts known in the art to be suitable for curing epoxy resins. Examples of suitable catalysts are set forth in application Serial No. 749,287, filed July 17, 1958, and application Serial No. 429,967, filed May 14, 1954, the assignee of which is the same as the assignee of the present invention.

In addition to the curing catalyst, at least one fibrous filler and at least one inert filler may be added to the composition.

The fibrous filler constituent may comprise glass fibres, acrylic fibres, polyester fibres and mixtures thereof. The fibrous fillers impart thixotropic properties to the composition in addition to imparting resistance to shrinkage and cracking to the cured packing composition.

Examples of suitable inert fillers which may be added separately or in combination with the fibrous fillers include silica, silicates, carbonates and mixtures thereof having an average particle size in the range of 100 to 325 mesh.

In preparing the composition of this invention, from 90 parts to 10 parts of epoxy resin and from 10 parts to 90 parts of a dimer acid are charged into a suitable mixer and mixed until the resultant composition is homogeneous.

If the particular epoxy resin employed is a liquid at room temperature the admixture is carried out at room temperature. If the epoxy resin is a solid at room temperature the admixture may be carried out at a temperature above the melting point of the resin. A vacuum in the range of from 5 to 50 mm. Hg is then impressed upon the mixer and the mixing continued for approximately 10 minutes to degas the composition.

If it is desired to provide a composition which will cure rapidly when applied to the generator rotor, up to 15 percent by weight based on the weight of epoxy resin, of an amine catalyst may be charged into the mixer with the epoxy resin and dimer acid.

At least one filler selected from the group consisting of glass fibers, polyester fibers, acrylic fibers, oxide may also be charged into the mixer with the epoxy resin and dimer acid.

At least one inert finely divided inorganic filler consisting of carbonates, silicates, silica powder and aluminum oxide may also be charged into the mixer with the epoxy resin and dimer acid. The total quantity of filler added must be within the epoxy resin to filler ratio range of 1.5:1 to 8:1 to insure the composition having a putty like consistency for ease of application.

The packing composition prepared as described above is introduced into the cavity between the risers and the coil support of the generator rotor and cured in place by heating.

With reference to Figure 1, there is illustrated a fragmentary cross-sectional view of a turbine generator rotor 10 illustrating a packing composition 12, prepared in accordance with the teaching of this invention, disposed between a riser 14 and the coil support 16 and the centering plate ring 18.

Figure 2:
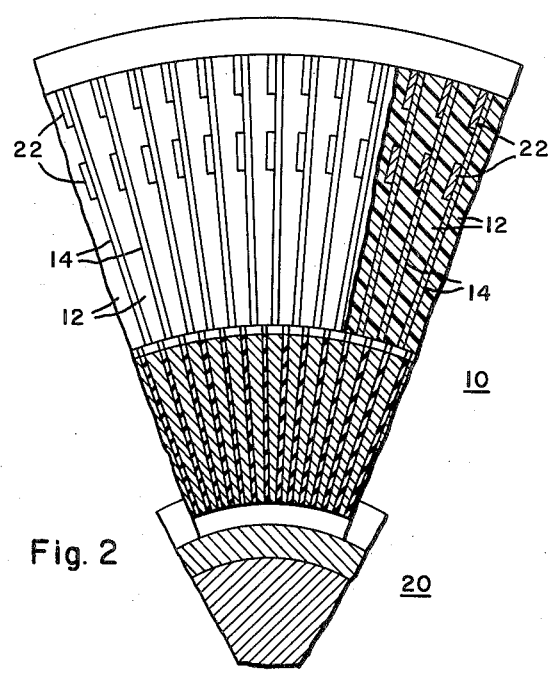
Figure 2 is a fragmentary front view of a turbine generator rotor packed with the composition of this invention.

With reference to Figure 2, there is illustrated a front view of a turbine generator 20 illustrating the cured packing composition 12 disposed between the risers 14 and the coil ends 22.

The following examples are illustrative of the practice of this invention. All parts are expressed as parts by weight unless otherwise specified.

*Example 1*

About 54 parts of sodium hydroxide are dissolved in about 600 parts of water in an open kettle provided with a mechanical stirrer. About 1 mol of bis-phenol "A" is added and the resultant mixture is stirred for about 10 minutes at a temperature of about 30° C. Thereafter, approximately 5 moles of epichlorohydrin are added, whereupon the temperature of the resultant mixture increases to about 50° C. to 70° C. due to the heat of reaction. About 42 parts of caustic soda dissolved in about 42 parts of water are then added with continuous stirring and the mixture is maintained at a temperature of about 90° C. to 100° C. for a period of about one hour. The mixture then is permitted to separate into two layers. The upper layer is withdrawn and discarded and the lower layer is washed with boiling water to which may be added acetic acid in an amount sufficient to neutralize unreacted caustic soda. A liquid resinous polymeric epoxide is obtained after substantially all of the wash water has been removed.

A polymeric epoxide resin suitable for use in accordance with this invention can be prepared by substituting from 1 to 10 moles of epichlorohydrin or epibromohydrin for the 5 moles of epichlorohydrin employed in Example I.

Example II

Approximately 160 parts by weight of the liquid polymeric epoxide of Example I and 180 parts by weight of a liquid $C_{36}$ dimer acid, prepared by polymerization of linoleic acid, were charged into a suitable mixer with 23 parts triethanolamine biborate, 130 parts of silica powder having an average particle size of 200 mesh and 130 parts milled glass fibres.

The above constituents were admixed until homogeneous, which required approximately 10 minutes. The mixer was then evacuated to a pressure of 5 mm. of mercury and the admixing continued for approximately 5 minutes more to de-gas the mixture. The composition thus prepared was ready for application to a turbine generator exciter rotor.

The composition, which has a putty like consistency, may be applied to the area behind the commutator neck of the turbine generator exciter rotor by any of the various methods known in the art, as for example, by forcing the composition between the risers into the cavity with an air pressure gun.

Example III

A quantity of the packing compound of Example II was cast into a strip 4 inches long and ½ inch thick and cured by heat at 135° C. for 24 hours.

The cured strip was repeatedly bent 180° without displaying any sign of fatigue or cracking.

The strip thus prepared was tested for thermal stability by determining its weight loss upon being heated in air for 25 days at 175° C. Figure 2 graphically illustrates the remarkable heat stability of the composition of this invention. As illustrated on the graph, the sample displayed a weight loss of only 2.2% after being maintained at a temperature of 175° C. per 25 days.

Figure 3:
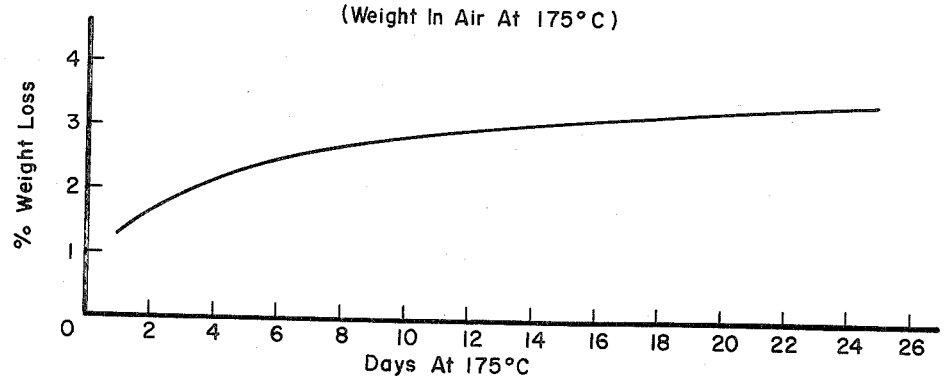
Figs. 3 and 4 are curves illustrating the thermal stability and resistance to water absorption, respectively, of the packing composition of this invention.
Figure 4:
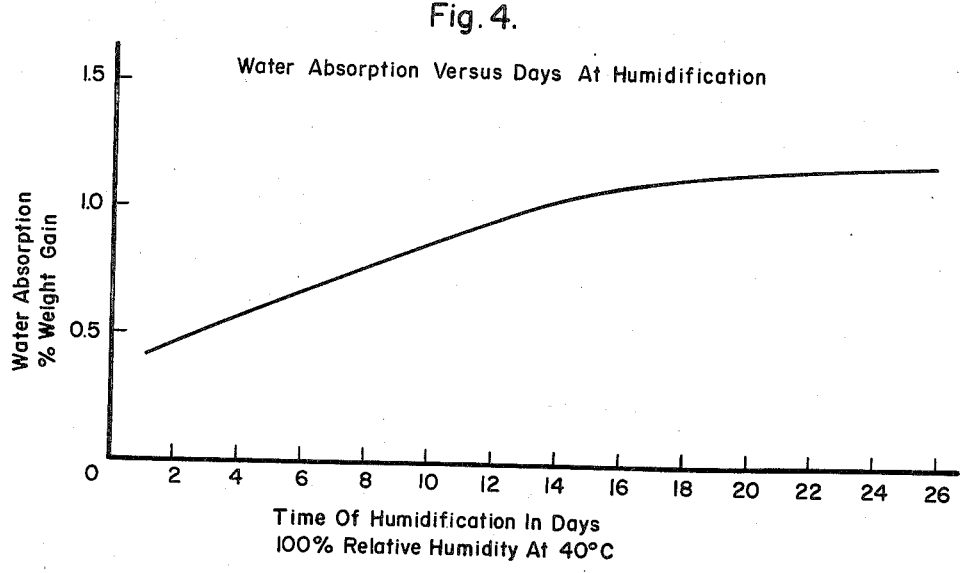

A second strip, prepared as described above, was placed in a 100% relative humidity, 40° C. atmosphere for 26 days. The results of this test are graphically illustrated in Figure 3. As illustrated on the graph, the sample displayed an increase in weight of only 1% due to water absorption.

While the potting composition of this invention has been described relative to its application to high speed turbine generator rotors, it will be understood that the composition is suitable for application in the same manner to low speed (1200 to 1800 r.p.m.) turbine generator rotors and as a casing for other electrical apparatus, for example, specialty transformers, current transformers, and the like.

Since certain changes in carrying out the above process and in the product embodying the invention may be made without departing from its scope, it is intended that the accompanying description and drawing be interpreted as illustrative and not limiting.

We claim as our invention:

An electrical machine including, in combination, a rotating member and a body of tough flexible packing composition applied thereto, the packing composition comprising the hardened reaction product derived by heating at a temperature of from about 125° C.–150° C. (A) from 10 to 90 parts by weight of a reactive glycidyl polyether of a dihydric phenol, (B) from 90 to 10 parts by weight of at least one dimeric unsaturated fatty acid having a carbon atom chain length of from 10 to 24 carbon atoms per molecule, (C) up to 15% by weight, based on the weight of (A) of an amine curing catalyst, (D) at least one fibrous filler material selected from the group consisting of glass fibers, acrylic fibers, and polyester fibers, and (E) at least one inert filler selected from the group consisting of silica, silicates, carbonates, and aluminum oxide, said inert filler material having a particle size within the range of 100 to 325 mesh, the total weight of (D) and (E) being within the range of resin to filler ratio of 1.5:1 to 8:1.

References Cited in the file of this patent

UNITED STATES PATENTS

| | | |
|---|---|---|
| 2,550,574 | Lynn | Apr. 24, 1951 |
| 2,712,535 | Fisch | July 5, 1955 |
| 2,814,744 | Demetriou | Nov. 26, 1957 |
| 2,820,914 | Rudoff | Jan. 21, 1958 |
| 2,846,599 | McAdam | Aug. 5, 1958 |
| 2,866,768 | Bolstad | Dec. 30, 1958 |
| 2,871,454 | Langer | Jan. 27, 1959 |

FOREIGN PATENTS

| | | |
|---|---|---|
| 758,146 | Great Britain | Oct. 3, 1956 |